US010327183B2

(12) United States Patent
Reial et al.

(10) Patent No.: US 10,327,183 B2
(45) Date of Patent: Jun. 18, 2019

(54) LINK SWITCH IN A WIRELESS COMMUNICATION SYSTEM

(71) Applicant: Telefonaktiebolaget LM Ericsson (publ), Stockholm (SE)

(72) Inventors: Andres Reial, Malmö (SE); Qingyu Miao, Beijing (CN); Edgar Ramos, Kirkkonummi (FI); Johan Rune, Lidingö (SE); Claes Tidestav, Bålsta (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 15/505,446

(22) PCT Filed: Feb. 8, 2017

(86) PCT No.: PCT/EP2017/052722
§ 371 (c)(1),
(2) Date: Feb. 21, 2017

(87) PCT Pub. No.: WO2018/114057
PCT Pub. Date: Jun. 28, 2018

(65) Prior Publication Data
US 2018/0227814 A1 Aug. 9, 2018

(30) Foreign Application Priority Data

Dec. 21, 2016 (WO) ................ PCT/CN2016/111369

(51) Int. Cl.
*H04W 24/10* (2009.01)
*H04W 36/06* (2009.01)
(Continued)

(52) U.S. Cl.
CPC .......... *H04W 36/06* (2013.01); *H04W 24/10* (2013.01); *H04W 36/0083* (2013.01);
(Continued)

(58) Field of Classification Search
CPC ... H04B 17/309; H04B 17/382; H04W 24/10; H04W 36/0083; H04W 36/0085; H04W 36/03; H04W 36/06; H04W 36/30
See application file for complete search history.

(56) References Cited

U.S. PATENT DOCUMENTS 6,044,272 A 3/2000 Kobylinski et al.
7,295,811 B2 * 11/2007 Stern-Berkowitz ......... H04W 36/18
343/757

(Continued)

FOREIGN PATENT DOCUMENTS

WO 2009021009 A1 2/2009
WO 2016054584 A2 4/2016
WO 2016198123 A1 12/2016

OTHER PUBLICATIONS

Unknown, Author , "Measurement requirements to monitor additional carriers in Idle/URA_PCH/CELL_PCH states", Qualcomm Incorporated, 3GPP TSG-WG4 Meeting #71, R4-143625, Seoul, Republic of Korea, May 19-23, 2014, 1-6.

(Continued)

*Primary Examiner* — Alpus Hsu
(74) *Attorney, Agent, or Firm* — Murphy, Bilak & Homiller, PLLC

(57) ABSTRACT

A wireless device in a wireless communication system is configured to perform measurements on a set of candidate links for supporting a network node in the system to make a decision as to which of the candidate links is to be a target link for a link switch. The wireless device reports (e.g., at the physical layer) measured candidate links one link subset at a time in order of the wireless device's preference for the target link, until the wireless device receives a target indication signal indicating which of the candidate links in the set is to be the target link. Any given link subset reports one (Continued)

or more candidate links which the wireless device has measured for the decision. Responsive to receiving the target indication signal, the wireless device performs the link switch to the indicated target link.

30 Claims, 7 Drawing Sheets

(51) Int. Cl.
*H04W 36/30* (2009.01)
*H04W 36/00* (2009.01)
*H04B 17/309* (2015.01)

(52) U.S. Cl.
CPC ........... *H04W 36/30* (2013.01); *H04B 17/309* (2015.01); *H04W 36/0085* (2018.08)

(56) References Cited

U.S. PATENT DOCUMENTS

| | | | |
|---|---|---|---|
| 7,308,264 B2* | 12/2007 | Stern-Berkowitz | H04W 36/30 342/354 |
| 7,764,957 B2* | 7/2010 | Stern-Berkowitz | H04W 36/18 455/422.1 |
| 7,953,065 B2* | 5/2011 | Lysejko | H04W 16/28 370/311 |
| 8,190,768 B2* | 5/2012 | Oba | H04W 36/30 709/238 |
| 8,675,617 B2* | 3/2014 | Cha | H01Q 3/2611 343/754 |
| 9,357,467 B1 | 5/2016 | Bartlett et al. | |
| 9,521,605 B2* | 12/2016 | Oh | H04W 36/30 |
| 9,642,040 B2* | 5/2017 | Ho | H04W 28/08 |
| 9,900,891 B1* | 2/2018 | Islam | H04W 36/0055 |
| 10,075,886 B2* | 9/2018 | Fan | H04W 36/0094 |
| 2013/0155847 A1* | 6/2013 | Li | H04W 24/04 370/225 |
| 2013/0286960 A1* | 10/2013 | Li | H04W 72/042 370/329 |
| 2016/0249223 A1* | 8/2016 | Egner | H04W 16/14 |
| 2017/0026938 A1* | 1/2017 | Onggosanusi | H04B 7/0626 |

OTHER PUBLICATIONS

Unknown, Author, "Verizon 5G TF; Air Interface Working Group; Verizon 5th Generation Radio Access; Physical layer procedures (Release 1)", TS V5G.213 V1.0, Jun. 2016, 1-43.

\* cited by examiner

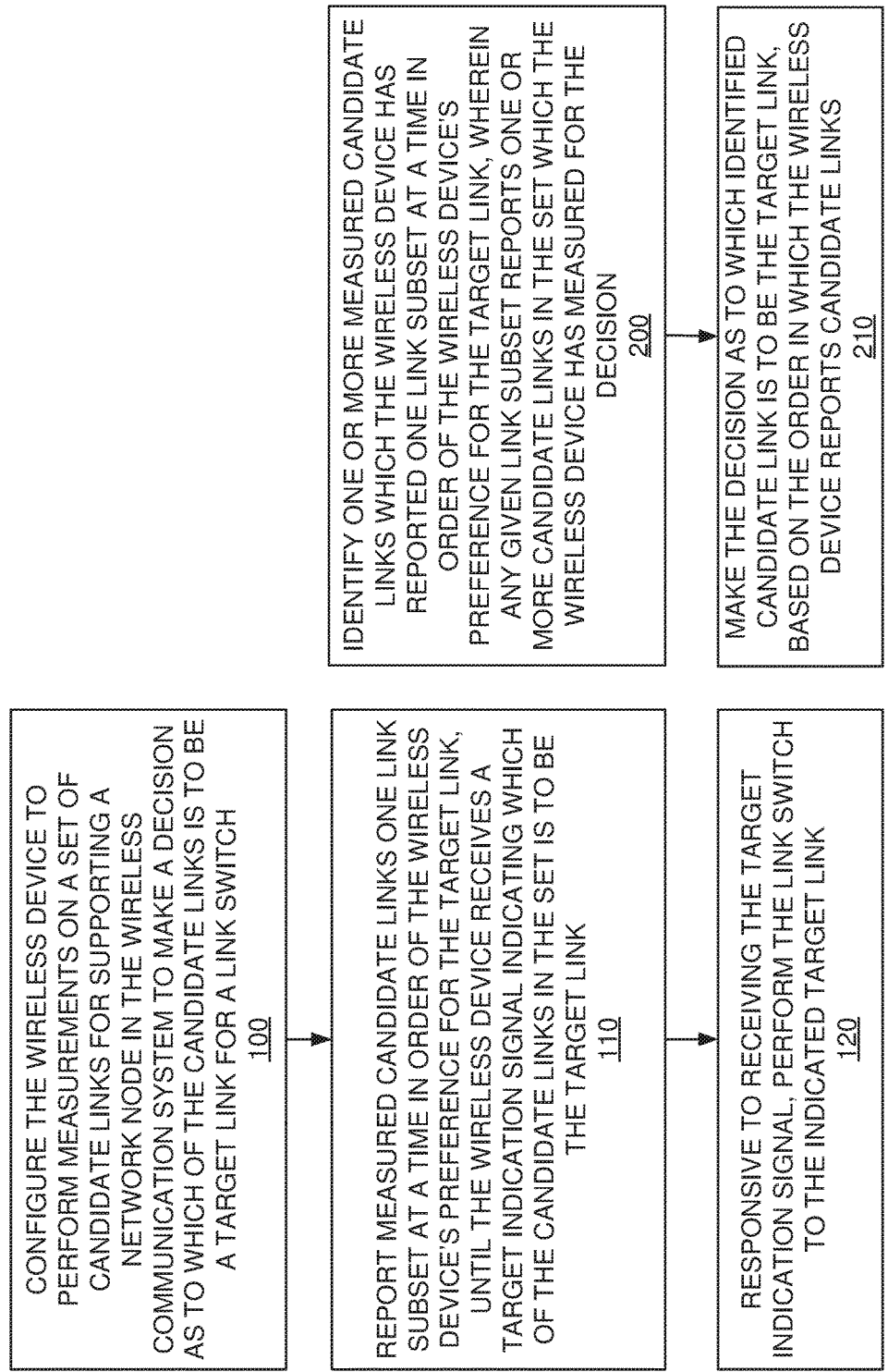

LINK SWITCH IN A WIRELESS COMMUNICATION SYSTEM

TECHNICAL FIELD

The present application generally relates to a wireless communication system, and more particularly relates to a link switch in a wireless communication system.

BACKGROUND

As channel conditions for a wireless communication device change, the device may switch (e.g., handover or reselect) from one wireless link to another in order to maintain service continuity. The device may for example switch from accessing the system via one access node, cell, sector, or beam (any of which may serve as a "link") to accessing the system via a different access node, cell, sector, or beam. Towards this end, when channel conditions on the link via which the device currently accesses the system deteriorates, the system may evaluate which of different candidate links the device should switch to, if any. The device in this regard may perform measurements on the different candidate links and report those measurements to another node in the network (e.g., the serving access node), so that the other node can make the link switch decision.

Known approaches report such measurements from the device to the network at the radio resource control (RRC) layer. Reporting measurements at this relatively high layer enables the device to convey rich, reliable measurement information. But RRC layer reporting requires considerable signaling overhead, heavy radio resource usage, and potentially high latency. High latency proves especially unattractive where a link switch must be performed quickly, e.g., before the serving link's quality degrades excessively.

SUMMARY

According to one or more embodiments herein, a wireless device reports measured candidate links one link subset at a time, e.g., in order of the device's preference for the target link. The device may do so until the device receives a signal indicating which candidate link is to be the target link. Reporting measured candidate links in this way, especially when reported at the physical layer, proves advantageous in some embodiments for realizing a link switch (e.g., handover or reselection) that is fast and lightweight on radio resource usage.

More particular, embodiments herein include a method performed by a wireless device in a wireless communication system. The method may comprise configuring the wireless device to perform measurements on a set of candidate links for supporting a network node in the wireless communication system to make a decision as to which of the candidate links is to be a target link for a link switch. The method may also comprise reporting measured candidate links one link subset at a time in order of the wireless device's preference for the target link, until the wireless device receives a target indication signal indicating which of the candidate links in the set is to be the target link. Any given link subset reports one or more candidate links which the wireless device has measured for the decision. This reporting may be performed, for example, at the physical layer. Regardless, the method may further comprise, responsive to receiving the target indication signal, performing the link switch to the indicated target link.

In some embodiments, this reporting comprises monitoring for receipt of the target indication signal during a monitoring interval after reporting any given link subset, and reporting a subsequent link subset responsive to the monitoring interval expiring without receipt of the target indication signal.

Alternatively or additionally, such reporting may comprise reporting any given link subset, except an initially reported link subset, only after determining that the wireless device did not receive the target indication signal in response to a previously reported link subset, and refraining from reporting any more link subsets responsive to receiving the target indication signal.

In any of these embodiments, reporting may entail (i) ranking measured candidate links according to defined ranking criteria at the wireless device that ranks candidate links in descending order of preference for the target link; (ii) reporting, in a first link subset, one or more candidate links that are ranked highest according to said ranking; (iii) monitoring for receipt of the target indication signal following reporting of the first link subset; and (iv) if no target indication signal is received during said monitoring, reporting, in a second link subset, one or more candidate links that are ranked next highest according to said ranking.

Embodiments herein also include a performed by a network node in a wireless communication system for making a decision as to which candidate link in a set of candidate links is to be a target link for a link switch by a wireless device, wherein the wireless device is configured to perform measurements on the set of candidate links. The method may comprise identifying one or more measured candidate links which the wireless device has reported (e.g., at a physical layer) one link subset at a time in order of the wireless device's preference for the target link, wherein any given link subset reports one or more candidate links in the set which the wireless device has measured for the decision. The method may also comprise making the decision as to which identified candidate link is to be the target link, based on the order in which the wireless device reports candidate links.

In some embodiments, the network node's making of the decision may entail evaluating whether any given identified candidate link is to be the target link, further based on one or more characteristics associated with that given identified candidate link. In this case, the method may further comprise determining the one or more characteristics using at least some information not reported by the wireless device. The one or more characteristics associated with the given identified candidate link may include one or more characteristics of the given identified candidate link, one or more characteristics of an access node providing the given identified candidate link, and/or one or more characteristics of a backhaul link supporting the given identified candidate link. In one embodiment, the one or more characteristics include one or more of traffic load, signaling load, uplink quality, backhaul quality, latency, and usage statistics.

Alternatively or additionally, making the decision may comprise evaluating whether any given identified candidate link is to be the target link, further based on one or more of: (i) whether selection of the given identified candidate link as the target link would require the wireless device to add another connectivity leg to the system; and (ii) whether selection of the given identified candidate link as the target link would require uplink/downlink separation whereby the wireless device connects to different access nodes for uplink and downlink communication.

In some embodiments, any given candidate link is reported by an uplink signal from the wireless device on that given candidate link. In this case, making the decision may comprise evaluating whether a reported candidate link is to be the target link by: determining a quality of the uplink signal which reports that candidate link; and evaluating whether the reported candidate link is to be the target link, based on the determined quality.

In one or more embodiments, the method by the network node may further comprise, after the wireless device reports any given link subset: determining whether to make the decision that a reported link candidate is to be the target link; and waiting for report of another link subset if it is determined not to make the decision.

Alternatively or additionally, the method by the network node may further comprise, responsive to making the decision, controlling transmission of a target indication signal to the wireless device indicating the target link according to the decision made.

In some embodiments, the network node may be a target radio access node providing the target link to the wireless device, such that the method is performed by that target radio access node. In one such embodiment, the method may further comprise transmitting signaling to a source radio access node, which provides a source link to the wireless device, indicating that the target radio access node has made the decision to switch the wireless device from the source link to the target link.

Alternatively, the method may be performed by a source radio access node providing a source link to the wireless device. In this case, the method may further comprise transmitting signaling to a target radio access node, which provides the target link to the wireless device, indicating the decision made.

In any of these embodiments, identifying one or more measured candidate links may comprise receiving signaling from one or more other network nodes that identifies at least one of the one or more measured candidate links which the wireless device has reported.

In some embodiments, the method at the network node may further comprise notifying another network node that provides one of the one or more identified candidate links that the decision has been made and/or that the wireless device will not report any more candidate links.

In one or more embodiments, the method at the network node further comprises, responsive to determining that no identified candidate link meets criteria specified as required for the target link, dynamically adapting the criteria to be less stringent as needed in order to make the decision.

In any of the above embodiments, whether at the wireless device or the network node, candidate links that are higher ranked by the wireless device may be reported sooner in time than candidate links that are lower ranked by the wireless device, according to defined ranking criteria at the wireless device that ranks candidate links in descending order of preference for the target link. In some embodiments, this defined ranking criteria ranks candidate links that are measured as having higher signal quality higher than candidate links that are measured as having lower signal quality.

In any of the above embodiments, identities of measured candidate links and results of the measurements performed on those candidate links may be reported at the physical layer one link subset at a time.

In any of the above embodiments, only selected ones of the measured candidate links that are deemed acceptable by the wireless device as the target link, according to one or more defined criteria, may be reported by the wireless device.

In any of the above embodiments, a confirmation signal may be transmitted by the wireless device towards the network node confirming receipt of a target indication signal indicating the target link in accordance with the decision made.

In any of the above embodiments, a reporting completed signal may be transmitted by the wireless device that indicates the wireless device will not report any more measured candidate links for the decision.

In any of the above embodiments, each link subset may report a single candidate link which the wireless device has measured for the decision. Alternatively, each link subset may report multiple candidate links which the wireless device has measured for the decision.

In any of the above embodiments, the method may further comprise dynamically configuring how many candidate links are to be reported by each link subset. This dynamic configuring may occur on a subset by subset basis in some embodiments.

In any of the above embodiments, any given link subset may be reported by one or more uplink synchronization signals from the wireless device that respectively identify the one or more candidate links in that given link subset.

In any of the above embodiments, any given candidate link may be reported by an uplink signal from the wireless device on that given candidate link.

In any of the above embodiments, any given link subset may be reported by one or more signals on radio resources that are reserved before the wireless device performs the measurements.

In any of the above embodiments, the target indication signal may be transmitted on a candidate link last used by the wireless device to report a link subset. Alternatively, the target indication signal may be transmitted on the target link.

In any of the above embodiments, the target indication signal may be an uplink grant and/or a timing advance configuration signal on a physical downlink control channel. Alternatively, the target indication signal may be a reference signal that contains a timing synchronization component that is common amongst the candidate links and an identity component that identifies the target link.

In any of the above embodiments, the candidate links may be candidate beams.

Embodiments herein also include corresponding apparatus, computer programs, carriers, and computer program products.

BRIEF DESCRIPTION OF THE DRAWINGS

FIG. 4A is a logic flow diagram of processing performed by a wireless device according to some embodiments.

FIG. 4B is a logic flow diagram of processing performed by a network node according to some embodiments.

DETAILED DESCRIPTION

Figure 1:
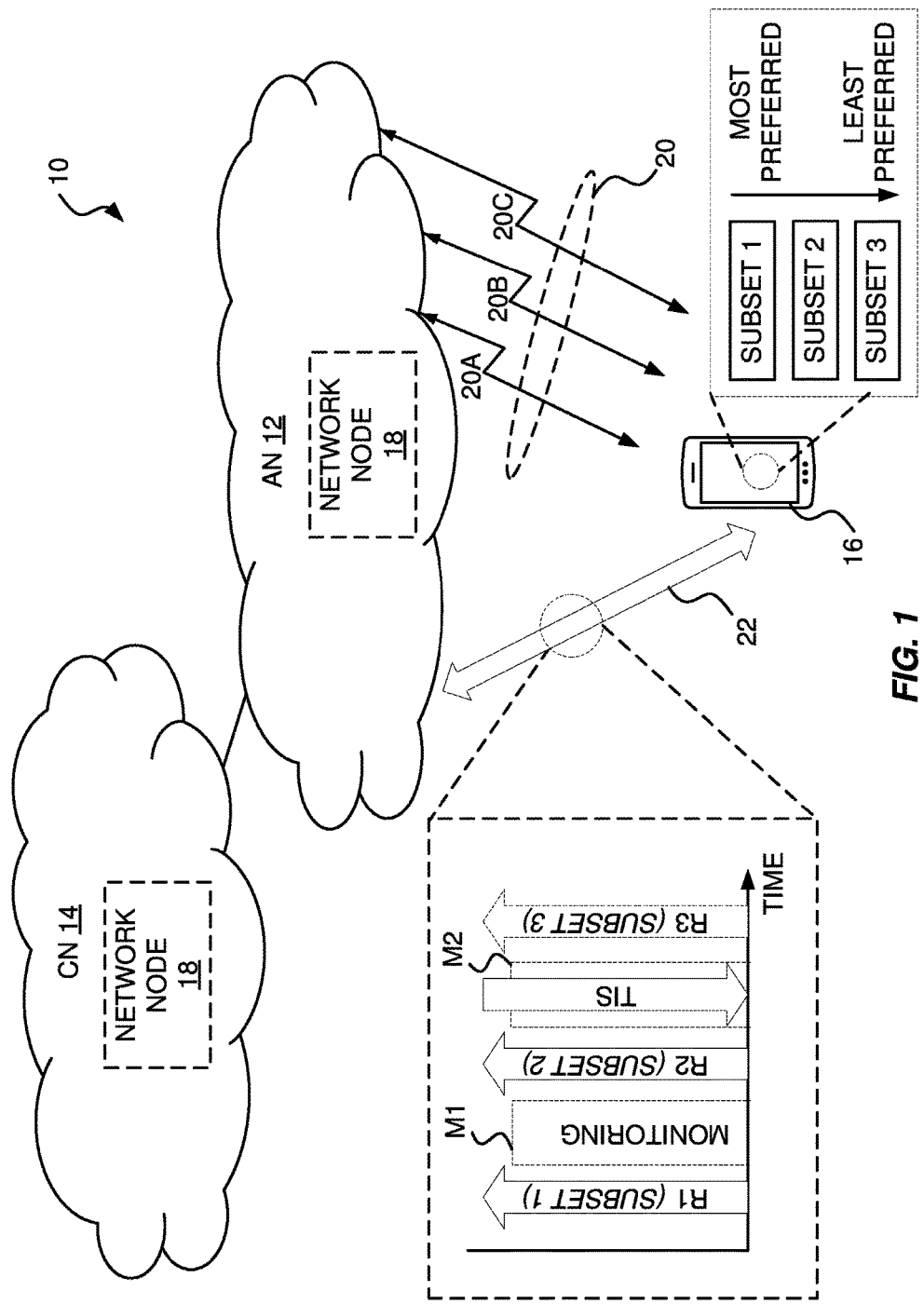
FIG. 1 is a block diagram of a wireless communication system that includes a wireless device and a network node according to some embodiments.

FIG. 1 illustrates a wireless communication system 10 according to one or more embodiments. As shown, the system 10 (e.g., a 5G system) may include an access network (AN) 12 and a core network (CN) 14. The AN 12 wirelessly connects a wireless communication device 16 (or simply "wireless device 16") to the ON 14. The ON 14 in turn connects the wireless device 16 to one or more external networks (not shown), such as a public switched telephone network and/or a packet data network (e.g., the Internet).

The AN 12 provides links via which the wireless device 16 may wirelessly access the system 10, e.g., using uplink and/or downlink communications. The AN 12 may for example provide links in the form of access nodes (e.g., base stations), cells, sectors, beams, or the like. Some links may provide wireless coverage over different geographical areas.

A network node 18 controls which link the device 16 uses to access the system 10. The network node 18 may be in the AN 12 (e.g., in the form of a base station), or may be in the CN 14 (e.g., in the form of a mobility management entity, MME). The network node 18 may control which link the device 16 uses by for example deciding that the device 16 is to switch (e.g., handover or reselect) from accessing the system 10 via one link (the "source" link) to accessing the system 10 via another link (the "target" link). The network node 18 may choose the target link from among a set of multiple links that the network node 18 considers as candidates for the target link. The device 16 may support the network node's link switch decision in this regard, such as by reporting measured candidate links to the network node 18.

FIG. 1 for instances shows that the network node 18 makes a decision as to which of the candidate links 20A, 20B, and 200 in a set 20 is to be the target link for a link switch. The network node 18 configures the wireless device 16 to perform measurements on the set 20 of candidate links, e.g., to perform measurements of reference signals transmitted on respective ones of the candidate links. The device 16 correspondingly reports measured candidate links to the network node 18 for supporting the network node's link switch decision. The device 16 may for instance report identities of candidate links that are measured, perhaps also with results of the measurements (e.g., in terms of the quality of the reference signals received on respective ones of the candidate links).

Notably, though, the wireless device 16 in FIG. 1 reports measured candidate links one "link subset" at a time, with any given link subset reporting one or more candidate links. Where each link subset reports a single candidate link, for example, the device 16 may report measured candidate links one link at a time. Accordingly, rather than reporting all candidate links in the set 20 during a single reporting instance or window, the device 16 may report candidate links one link subset at a time by reporting different portions of those candidate links during multiple reporting instances or windows distributed over time, e.g., within a reporting session defined for the decision. In at least some embodiments described more fully below, the device 16 may report measured candidate links in this way at the physical layer (e.g., by sending candidate link reports as physical layer signals, such as uplink synchronization signals). Physical layer reporting may for instance facilitate fast, low-latency link switching that is robust against sudden serving link loss. Regardless of the layer at which reporting is performed, by reporting measured candidate links one link subset at a time, the device 16 may effectively delay or defer reporting one or more of the candidate links in the set on which the device 16 is configured to measure, e.g., as compared to reporting all candidate links in the set at the same time.

In fact, in some embodiments, the device 16 may delay or defer reporting one or more of the candidate links in the set, in case the network node 18 decides in the interim that one of the previously reported candidate links is to be the target link. If the network node 18 decides that an already reported candidate link is to be the target link, the device 16 may refrain from reporting any additional candidate links in the set, e.g., in order to conserve radio resources.

In one or more embodiments, for example, the wireless device 16 reports measured candidate links one link subset at a time, until the device 16 receives a target indication signal (from the network node 18 or another node in the system 10) indicating which of the candidate links in the set 20 is to be the target link. Like link reporting, this target indication signal may also be transmitted at the physical layer in some embodiments. Regardless, responsive to receiving the target indication signal, the device 16 may refrain from reporting any more link subsets and instead perform the link switch to the indicated target link.

In some embodiments, the device 16 may report measured candidate links one link subset at a time, while monitoring for the target indication signal to be received in between or even during report transmissions, e.g., in a frequency duplex division (FDD) manner. In other embodiments, the device 16 may report any given link subset (except the initially reported link subset) only after determining that the device 16 did not receive the target indication signal in response to a previously reported link subset. In this case, the device 16 may alternate in time between reporting link subsets and monitoring for the target indication signal, e.g., such that different link subsets are reported during different, non-consecutive time resources, and monitoring is performed during intervening time resources. FIG. 1 illustrates one example in this regard.

As shown in FIG. 1, after the wireless device 16 initially transmits a first report R1 that reports a first link subset 1, the device 16 monitors for receipt of the target indication signal during a monitoring interval M1. The device 16 transmits a second report R2 that reports a second link subset 2 only responsive to that monitoring interval M1 expiring without receipt of the target indication signal. That is, the device 16 delays reporting the second link subset 2 until after monitoring reveals that the network node 18 did not choose any of the candidate links in the first link subset 1 to be the target link. After reporting the second link subset 2, the device 16 again monitors for receipt of the target indication signal during a monitoring interval M2. In this example, the device 16 indeed receives the target indication signal (TIS) during monitoring interval M2. The device 16 in this case refrains from reporting any more link subsets, including for example a third link subset 3 that would have been reported after expiration of the monitoring interval M2 had the target indication signal not yet been received. Instead, responsive to receiving the target indication signal during monitoring interval M2, the device 16 may proceed with performing the link switch to the indicated target link.

Figure 2A:
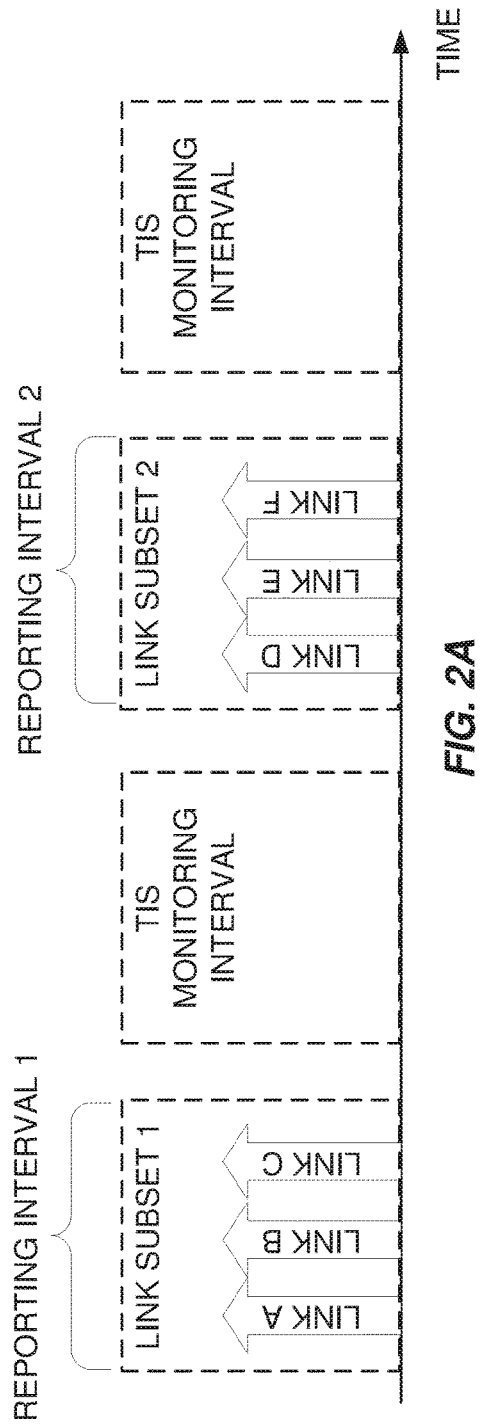
FIG. 2A is a timing diagram illustrating reporting of candidate links one link subset at a time according to some embodiments.
Figure 2B:
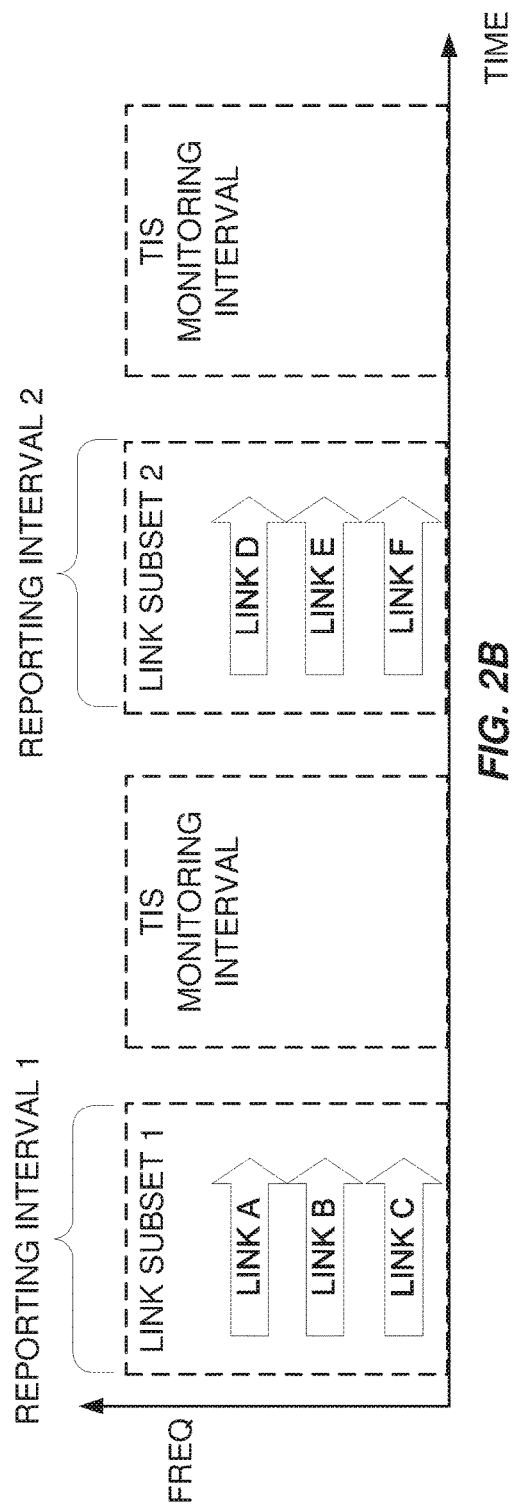
FIG. 2B is a timing diagram illustrating reporting of candidate links one link subset at a time according to other embodiments.

In some embodiments, the wireless device 16 reports the candidate links in a particular order. For example, the wireless device 16 may report measured candidate links one link subset at a time in order of the device's preference for the target link. FIG. 1 for instance shows that the wireless device 16 organizes the measured candidate links into subsets 1, 2, and 3, ordered from most preferred to least preferred, e.g., with candidate link 20A most preferred in subset 1, candidate link 20B next preferred in subset 2, and candidate link 20C least preferred in subset 3. In this case, then, the wireless device 16 may report more preferred link subsets sooner in time than reporting lesser preferred link subsets.

Where a link subset reports multiple candidate links, the device's preference among the candidate links within that link subset may be indicated in any number of ways, e.g., via multiplexing in the time, frequency, and/or code domain such that individual candidate links within a link subset may be reported consecutively or in parallel within the time domain. FIGS. 2A-2B for instances show an example where the device 16 reports measured candidate links one link subset at a time by reporting different link subsets 1 and 2 during respective reporting intervals 1 and 2, e.g., with each of those reporting intervals followed by a TIS monitoring interval. A reporting interval may be for instance between 1 and 10 subframes, between 1 and 10 ms, or the like, e.g., in order to give the network node 18 time to process and respond, but also avoid switching latency. Within each reporting interval of FIG. 2A, the device 16 time multiplexes reporting of the individual candidate links so as to report more preferred links sooner in time than lesser preferred links, e.g., Link A is more preferred than Link B and Link B is more preferred than Link C. Within each reporting interval of FIG. 2B, by contrast, the device 16 frequency multiplexes reporting of the individual candidate links so as to report links according to a predefined convention. The device 16 may for instance report more preferred links on higher frequencies than lesser preferred links, e.g., Link A is more preferred than Link B and Link B is more preferred than Link C.

Figure 3A:
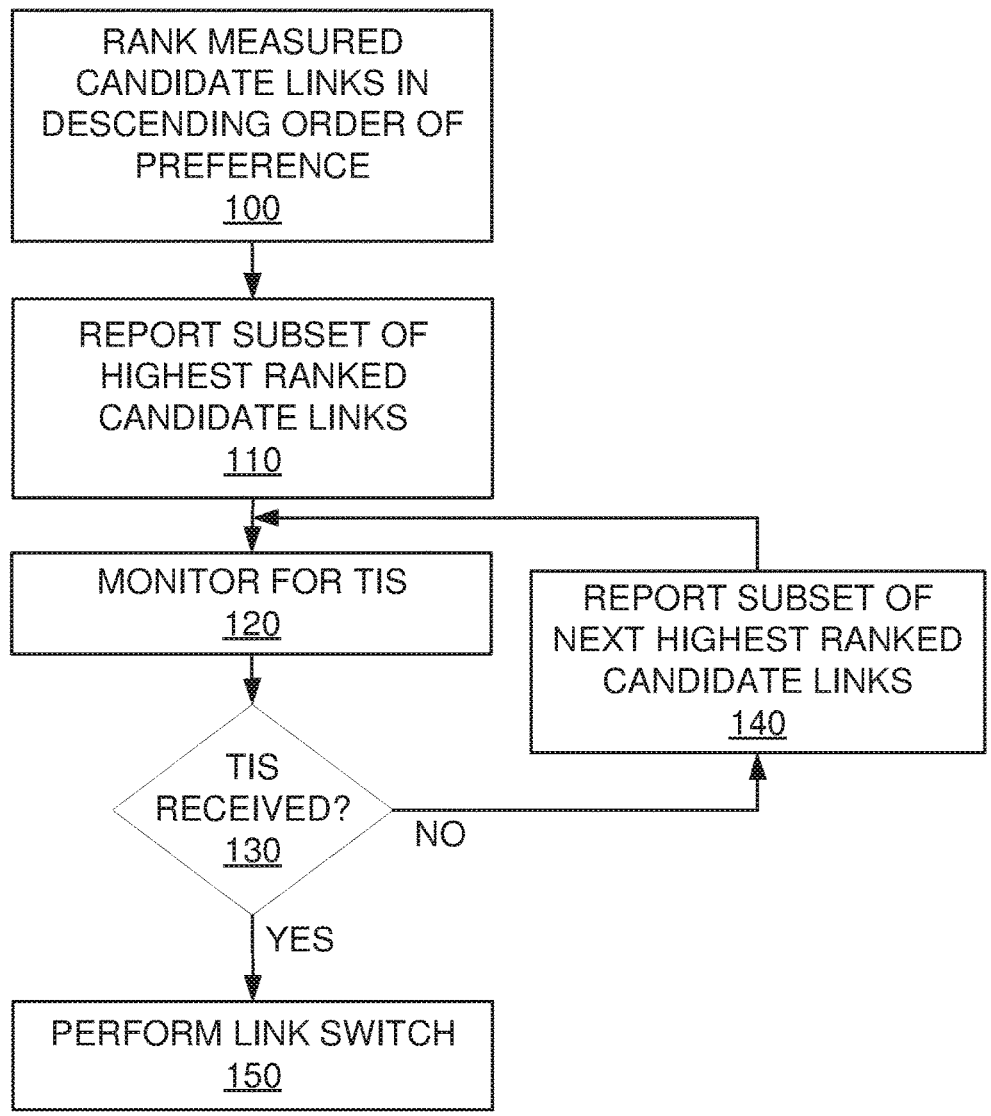
FIG. 3A is a logic flow diagram of processing performed by a wireless device for candidate link reporting according to some embodiments.

Regardless of the number of candidate links reported within any given link subset, FIG. 3A illustrates processing performed by the wireless device 16 for ordered candidate link reporting according to some embodiments. As shown, the device 16 ranks measured candidate links in descending order of preference for the target link (Block 100). Higher ranked measured candidate links are more preferred for the target link than lower ranked measured candidate links. This ranking may be performed according to defined ranking criteria at the device 16, e.g., that specifies ranking as a function of measured signal quality on the candidate links such that candidate links measured as having higher signal quality are ranked higher than candidate links measured as having lower signal quality. In any event, having ranked the measured candidate links, the device 16 reports (e.g., at the physical layer) a first link subset that contains one or more highest ranked candidate links (Block 110). Following reporting of the first link subset, the device 16 monitors for receipt of the target indication signal (Block 120). If no target indication is received during that monitoring (NO at Block 130), the device 16 then reports a second link subset that contains one or more of the next highest ranked candidate links (Block 140). Following reporting of the second link subset, the device 16 again monitors for receipt of the target indication signal (Block 120). This process of alternating between reporting link subsets and monitoring for the target indication signal may continue until a defined reporting limit is reached (e.g., until the device 16 reports all candidate links in the set 20, or until the device 16 reports selected ones of the candidate links which are deemed acceptable by the device 16 as the target link), or until the device 16 receives the target indication signal (whichever occurs first). Indeed, once the device 16 receives the target indication signal, the device 16 refrains from reporting any further link subsets and instead performs the link switch to the indicated target link (Block 150).

In some embodiments, the device 16 may also transmit a confirmation signal confirming or acknowledging receipt of the target indication signal. This way, the target indication signal may be retransmitted or repeated if not acknowledged, e.g., within a predefined acknowledgement period.

Alternatively or additionally, the device 16 may also transmit a reporting completed signal indicating the device 16 will not report any more measured candidate links for the link switch decision. The reporting completed signal may prompt the network node 18 to choose the target link from among those measured candidate links that have been reported, e.g., rather than waiting for report of other candidate links in the set 20 that may not be acceptable to the device as the target link.

Irrespective of these possible variations, reporting link subsets in order of the device's preference for the target link may implicitly indicate the device's preference for the target link to the network node 18. In these and other embodiments, therefore, the network node 18 may make the decision as to which candidate link is to be the target link, based at least in part on the order in which the device 16 reports candidate links. The network node 18 may for example apply a bias towards selecting a candidate link reported earlier in time, over a candidate link reported later in time, e.g., so as to preferentially select a candidate link more preferred by the device 16. The network node 18 in some embodiments may also base its decision on the results of the device's measurements on the candidate links, as reported by the device 16.

Figure 3B:
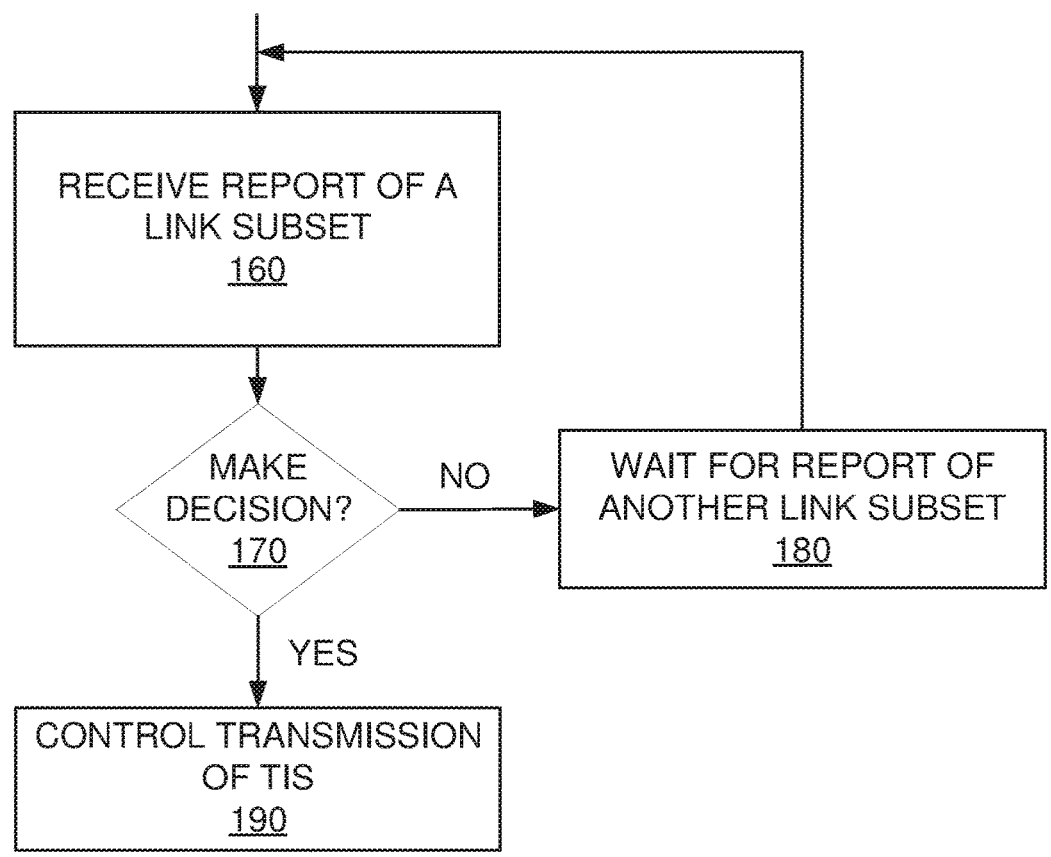
FIG. 3B is a logic flow diagram of processing performed by a network node for making a link switch decision according to some embodiments.

FIG. 3B illustrates processing performed by the network node 18 in this regard according to some embodiments. As shown, the network node 18 receives a report of a link subset (Block 160). Responsive to receipt of such a report, the network node 18 determines whether to make the link switch decision at this point, i.e., whether to choose one of the already reported link candidates to be the target link (Block 170). If the network node 18 decides to not make the decision yet (NO at Block 170), the network node 18 waits for the report of another link subset (Block 180). That is, the network node 18 effectively defers the link switch decision until one or more additional candidate links are reported, giving the network node 18 more candidate links from which to choose the target link.

After receiving the report of another link subset (Block 160), the network node 18 may revisit whether to make the link switch decision (Block 170). In some embodiments, the network node 18 may consider only whether to choose a candidate link in the last reported link subset. In other embodiments, though, the network node 178 may consider whether to choose any previously report candidate link as the target link, including those not reported in the most recent link subset. In considering candidate links reported in different link subsets, the network node 18 may account for the order in which those candidate links were reported, e.g., so as to prefer the earlier reported candidate link over the later reported candidate link. In any event, responsive to eventually making the link switch decision (YES at Block 170), the network node 18 controls the transmission of the target indication signal to the wireless device 16 (Block 190). The network node 18 may for instance transmit the target indication signal itself, or direct that another node in the system 10 transmit the target indication signal to the device 16. Of course, in some embodiments, the network node 18 upon finding no candidate link to be acceptable as the target link may abort the link switch or restart the measurement procedure with a different or expanded set of candidate links as options. Similarly, if the device 16 does not receive a target indication signal after candidate link reporting completes, the device 16 may maintain its current serving link connection and/or may start the measurement process again.

Note that the network node 18 in some embodiments may make its link switch decision based on one or more other criteria besides the order in which the device 16 reports candidate links. For example, the network node 18 may base its link switch decision on other "network-side" criteria which may not be determinable by or reported by the wireless device 16 alone, e.g., the network-side criteria may be determinable only upon aggregating reports from multiple devices or may be determinable only by network-side measurements. In this way, the link switch decision remains network-controlled, rather than device-controlled, since the device's link detection and reporting approach may not be dispositive of which candidate link is chosen as the target link. This network-controlled nature of the link switch decision may prove advantageous in that it enables the decision to optimize network-wide objectives. Such objectives may include for instance link load balancing, maximizing overall network capacity, bi-directional link performance, or the like.

In one embodiment, for example, the network node's making of the decision involves evaluating whether any given candidate link is to be the target link, further based on one or more characteristics associated with that link. The one or more characteristics may be associated with the link in the sense that the one or more characteristics include one or more characteristics of the candidate link itself, one or more characteristics of an access node providing the candidate link, and/or one or more characteristics of a backhaul link supporting the candidate link. No matter the particular type of characteristic(s), the network node 18 may determine these one or more characteristics using at least some information not reported by the wireless device 16. This information may for example be reported by one or more other wireless devices or one or more other network nodes. Alternatively or additionally, this information may be determined by the network node 18 itself, e.g., in the form of measurements that the network node 18 itself performs or in the form of information that the network node 18 aggregates from multiple sources. The information in this regard may be "network-side" information that the wireless device 16 itself does not have visibility into.

For example, one characteristic on which the network node 18 bases its decision in some embodiments is load associated with a certain candidate link. Such load may represent load attributable to traffic (e.g., user data), signaling, or any combination thereof. And the load may be associated with the candidate link in the sense that it represents load on the candidate link itself, load on an access node that provides the candidate link, load on a backhaul link supporting the candidate link, or any combination thereof. The load associated with a certain candidate link may be determined by the network node 18 itself responsive to the device 16 reporting that candidate link, e.g., as the network node 18 has visibility into the traffic and/or signaling associated with the candidate link for any other devices accessing the system 10 on that link. In some embodiments, for example, the network node 18 determines the load associated with a link using load information that the network node 18 measures itself or aggregates from multiple sources (e.g., multiple devices or network nodes). Such dynamic load determination by the network node 18 may advantageously account for load changes that may have suddenly occurred since link measurements were initiated. In any event, the network node 18 may rank each reported candidate link as a function of the link's reporting order as well as the load associated with the link, e.g., with earlier reporting and lighter loads warranting higher ranking. The network node 18 may then choose the highest ranked candidate link, in an effort to choose the earliest reported link with the load that is the lightest (or at least below a defined load threshold).

As one example, the network node 18 may first receive a report of a candidate link associated with a relatively low load. But, rather than immediately deciding that the reported candidate link is to be the target link, the network node 18 waits to receive report of another candidate link, in case another candidate link is associated with an even lower load. The network node 18 in doing so may prioritize load to a degree over absolutely honoring the device's preference in links, as suggested by the link reporting order. If the network node 18 does not receive report of another candidate link associated with a lighter load, e.g., within a certain reporting window, the network node 18 in some embodiments may then choose the earlier reported candidate link as the target link.

In other embodiments, the network node 18 may simply choose the earliest reported candidate link associated with a load that is below a defined threshold. In this case, the network node 18 prioritizes the device's preference in links over load, as the network node 18 would not "fish" for links associated with lighter loads at the expense of upsetting the device's preference for the target link.

Although the one or more characteristics that the network node 18 may base its decision on were exemplified with load as one possible characteristic, the one or more characteristics may alternatively or additionally include other types of characteristics associated with a link. Other types of characteristics in this regard may include one or more of: uplink quality, backhaul quality, latency, usage statistics, uplink/downlink separation requirements, and multi-connectivity requirements. In one specific example, for instance, the network node 18 may choose the target link from among reported candidate links, in order to realize a particular tradeoff between the device's preference for the target link (as represented by the link reporting order), load associated with the links, and latency associated with the links.

As another specific example in the context of multi-connectivity, the network node 18 may evaluate whether any given candidate link is to be the target link, based on the link's reporting order and further based on whether selection of that link as the target link would require the device 16 to add another connectivity leg to the system 10. For instance, the network node 18 may prefer selection of a candidate link that would not require the addition of another connectively leg (e.g., connectivity to another access node), over selection of a candidate link that would require such addition.

As a further example in the context of uplink/downlink separation, the network node 18 may evaluate whether any given candidate link is to be the target link, based on the link's reporting order and further based on whether selection of that link as the target link would require uplink/downlink separation, whereby the device 16 connects to different access nodes for uplink and downlink communication (i.e., one access node for downlink and a different access node for uplink). For instance, where the link switch only concerns the switching of the link used for either uplink or downlink, not both, the network node 18 may prefer selection of a candidate link that would not require uplink/downlink separation, over a candidate link that would require such separation.

As yet another example, the network node 18 may choose the target link from among reported candidate links, in order to realize a particular tradeoff between the device's preference for the target link (as represented by the link reporting order) and measured uplink quality associated with the links. In one embodiment, for instance, any given candidate link may be reported by an uplink signal from the device 16 on that candidate link, e.g., such that the device 16 reports different candidate links with uplink signals transmitted on those respective candidate links. In this case, the quality of the respective uplink signals may be measured, e.g., by one or more networks nodes that respectively receive those uplink signals. Accordingly, the network node 18 may evaluate whether a reported candidate link is to be the target link by determining the quality of the uplink signal which reports that candidate link and evaluating whether the link is to be the target link based on that determined quality (as well as the link's reporting order). Where the device forms its preference for the target link based on measured downlink quality associated with the links, such an approach that accounts for uplink quality associated with the links may aim to select a target link with the best bi-directional (i.e., uplink and downlink) performance.

In these and other embodiments where the network node 16 attempts to identify and select a target link that meets one or more specified criteria (e.g., a specified load level, a specified uplink quality threshold, etc.), scenarios may occur where none of the reported candidate links meet that criteria. In some embodiments, this may mean that the network node 16 does not make the link switch decision. In other embodiments, though, the network node 16 may dynamically adapt the one or more criteria to be less stringent, as needed in order to make the link switch decision. This dynamic adaptation of the selection criteria may for instance enable a "softer" tradeoff between the aspects impacting the target link selection. For example, if none of the candidate links are associated with loads below a defined load threshold and/or uplink qualities above a defined quality threshold, the network node 16 may dynamically adapt one or more of those thresholds, e.g., as needed to select the "least bad" candidate link.

Alternatively or additionally, the number of candidate links to be reported by each link subset may be dynamically adapted or configured, e.g., based on any of the above-described characteristics or other characteristics. That is, although in some embodiments the number of candidate links reported in each link subset is statically defined (e.g., to be one or a predefined number greater than one), in other embodiments that number is dynamically adapted. The network node 18 may indicate the number of candidate links to be reported in a link subset when configuring the device 16 to perform the measurements.

Such dynamic adaptation may be made on a decision-wide basis so as to apply to all reported link subsets. In one embodiment, for example, the device 16 receives a single indicator that indicates how many links are to be reported in each link subset. In another embodiment, the device 16 may receive an indicator for each candidate link indicating whether reporting for that candidate link may be bundled with one or more other candidate links in a single link subset, but only reports multiple links in each subset if all candidate links permit it; otherwise, the device 16 reports a single link in each subset. In still other embodiments, the dynamic adaptation may be made on a subset by subset basis, such that different subsets may report different numbers of links. For example, the device 16 may alternate between single link reporting and multi-link reporting during the same measurement procedure. The device 16 may for instance report a single link in a first subset, await for a TIS, and then report multiple links in a second subset, e.g., if report bundling is permitted for those links.

Regardless, dynamic adaptation may be based upon for instance any of the above-described characteristics associated with a candidate link and/or any network deployment characteristics or operating status. In one embodiment, for instance, the network node 18 dynamically configures the number of candidate links in a link subset to be one when the network node 18 detects high backhaul latency and low loads. And the network node 18 dynamically configures the number of candidate links in a link subset to be a number greater than one when the network node 18 detects high downlink traffic loads, e.g., in order to better facilitate load balancing. In general, though, the more candidate links reported in a link subset, the greater the number of radio resources consumed and the greater the risk that radio resources may be wasted.

Of course, as alluded to above, link reporting may be performed in some embodiments at the physical layer, meaning that radio resource consumption may be leaner anyways as compared to higher-layer (e.g., RRC layer) reporting with higher overhead. Reporting at the physical layer may be realized using any type of physical signal or message. A physical signal or message may for instance convey a predefined sequence that maps to a link identity or convey coded data that carries a link identity. In one embodiment, for example, any given link subset is reported by one or more uplink synchronization signals (USSs) from the wireless device 16 that respectively identify the one or more candidate links in that given link subset. A USS may for instance be a locally unique signal which carries a synchronization pilot and an identity of a candidate link.

Link reporting may also convey measurement results at the physical layer in a similar manner. A physical signal or message may for instance convey a predefined sequence that maps to a measurement result value or convey coded data that carries a measurement result value.

No matter the particular type of physical signal used for reporting, though, any given candidate link in some embodiments is reported by one or more signals on radio resources that are reserved before the wireless device 16 performs the measurements. That is, resources for link reporting may be reserved ahead of time, which may enable reporting to be conveyed with minimal latency.

Alternatively or additionally, the target indication signal used in some embodiments above may be transmitted at the physical layer using any type of physical signal. In one embodiment, for example, the target indication signal is an uplink grant and/or a timing advance configuration signal, e.g., on a downlink control channel such as a physical downlink control channel (PDCCH). In this case, the wireless device 16 may detect the target indication signal using downlink synchronization obtained during the measurement phase. In another embodiment, by contrast, the target indication signal is a special reference signal dedicated to indicating the target link, i.e., a target indication reference signal. The reference signal may for instance contain a timing synchronization component that is common amongst the candidate links and an identity component that identifies the target link. The timing synchronization component may even provide the downlink synchronization of the target link. In one embodiment, the target indication signal is the same (repeated) reference signal as that which the device 16 measured on the target link for reporting. In another embodiment, the target indication signal may be a single sequence used no matter which candidate link is selected as the target link.

Different embodiments herein envision that link reporting may be performed over different possible links, as may target indication. In one embodiment, for example, the device 16 reports any given candidate link using an uplink signal transmitted on that given candidate link, or reports any given link subset using an uplink signal transmitted on one of the candidate links included in that link subset. In another embodiment, by contrast, the device 16 may report a given candidate link by transmitting an uplink signal over a different candidate link, e.g., the current serving link. Likewise, in one embodiment, the target indication signal may be transmitted on the indicated target link. This may advantageously improve the robustness of link switching to sudden quality loss on the source link. In another embodiment, by contrast, the target indication signal may be transmitted on the candidate link last used by the device 16 to report a link subset.

The link over which reporting and target indication is transported, and other factors, may implicate different nodes in the system 10 in the link switch decision. For example, in some embodiments where the device 16 reports any given candidate link using an uplink signal transmitted on that given candidate link, the access node providing that candidate link may itself make a local, independent decision as to whether the reported candidate link is to be the target link. That is, even though the device 16 may report candidate links to different access nodes if those links are in fact provided by multiple access nodes, no inter-access node coordination may be needed, since each access node may independently assess whether one or more of the candidate links it provides meets selection criteria specified for the target link. An access node that receives report of a candidate link which meets the selection criteria may simply select that link as the target. The access node may do so irrespective of whether any other candidate links provided by other access nodes may better meet that selection criteria, at least in embodiments where ordered link reporting by the device 16 one subset at a time suggests that the device 16 prefers the earliest reported link which meets the selection criteria. In these embodiments where each access node providing a candidate link independently assesses whether that candidate link is to be the target link, each of those access nodes may therefore independently operate as the network node 18 in FIG. 1.

In some embodiments such as this where different access nodes may make independent link switch decisions in their role as network node 18, the device may report just one candidate link at a time. Limiting the link subset size to one in this way may preclude multiple access nodes that provide different candidate links from each independently selecting a different candidate link as the target link, resulting in a target link conflict or race condition. This way, only one access node (e.g., the target access node) will ultimately make the link switch decision. The only sort of inter-node coordination that may take place may involve notifying the source access node that the serving access node has changed. For example, the network node 18 may transmit signaling to the source access node indicating that the decision has been made to switch the wireless device 16 from the source link to the target link. The target access node may also retrieve the device's context (e.g., packet data protocol context) from the source access node, unless it has been transferred proactively prior to the switch.

Correspondingly, in other embodiments where the device 16 may report a candidate link subset that includes more than one candidate link, inter-node coordination may be required when different access nodes provide different reported candidate links in the same subset. For example, in some embodiments, the network node 18 operates as a central, controlling, or coordinating node that receives signaling from one or more other network nodes identifying at least one of the one or more measured candidate links which the wireless device 16 has reported, e.g., so as to centrally collect the device's link reports. In some embodiments, the network node 18 may receive signaling indicating candidate link reporting in the same order as that with which the device 16 reports it, e.g., any intermediate nodes forward candidate link reporting immediately or promptly on to the network node 18. Regardless, the network node 18 may then transmit signaling to one or more access nodes, including for instance the target access node, indicating the decision made. At least one of those access nodes may then in turn send the target indication signal to the device 16. The network node 18 in these embodiments may be for instance the source or serving access node.

Embodiments such as this where the network node 18 operates as a controlling node provide an architecture conducive to adaptive selection criteria as described above. For example, any access node that receives candidate link reporting from the device 16 may forward or otherwise notify the network node 18 of that reporting. If the network node's evaluation of the reporting suggests that no candidate link meets the current selection criteria for the target link, the network node 18 may dynamically adapt the criteria to be less stringent, as needed in order to make the decision.

A variation of these adaptive selection criteria embodiments employs a hierarchical or distributed decision architecture. In this variation, a link switch decision may be made either locally (i.e., independently) by an access node that provides a candidate link, or centrally by a controlling node if no access node makes the decision locally. If an access node makes the link switch decision locally, for example, the access node may inform the controlling node of the decision, either before or after transmitting the target indication signal to the device 16. If the controlling node is not informed of a decision by any access node, the controlling node makes the decision based on candidate link reporting that the controlling node proactively or reactively collects from the access nodes involved. The collected candidate link reporting may still indicate the device's reporting order, e.g., via the order in which the controlling node receives that reporting or via timestamped receipt by the access nodes. The controlling node may also make the decision based on information obtained regarding other criteria or characteristics discussed above. The controlling node may then inform the access node that controls the selected target link, whereupon that access node transmits the target indication signal to the device 16.

In any embodiment where an access node may receive candidate link reporting from the device 16, but the link switch decision may be made elsewhere, the access node may be informed when the decision is made and/or that the device 16 will not report any more candidate links. This way, rather than the access node continuing to monitor for additional candidate link reporting from the device 16 (at least until a defined maximum reporting session duration), the access node may cease that monitoring when no longer needed. The monitored radio resources may then be used for other communications, so as to conserve capacity. In one embodiment, for example, the controlling node (e.g., source access node) or the target access node informs all non-selected access nodes that candidate link reporting is finished. In another embodiment, the device 16 transmits "end of reporting" signaling either before or after it receives the target indication signal. This end of reporting signaling may be for instance an uplink synchronization signal which has a sequence dedicated or configured to indicate the device 16 has finished candidate link reporting.

In general, therefore, a network node 18 herein may be any node in the AN 12 or CN 14 that evaluates whether a reported candidate link is to be the target link. In at least some embodiments where such evaluation may be performed by more than one node, there may be more than one node functioning as a network node 18. For example, a network node 18 may be the source access node, the target access node, a core network node, or any controlling node (e.g., C-RAN). A network node 18 may receive link reporting directly from the device 16 to support its link switch decision, or may receive link reporting indirectly from one or more access nodes. And a network node 18 may transmit the target indication signal directly to the device 18, or may direct an access node (e.g., the target access node) to transmit the target indication signal to the device 18.

Different embodiments may therefore involve the wireless device 16 transmitting candidate link reporting to different nodes and/or monitoring for a target indication signal from different nodes. For instance, in some embodiments, the device 16 reports a candidate link using an uplink signal transmitted on that candidate link, whereas in other embodiments the device 16 may report a candidate link using an uplink signal transmitted on a different candidate link (e.g., the serving link). And, in some embodiments, the device 16 monitors for the target indication signal only on the candidate link that the device 16 last used for candidate link reporting, whereas in other embodiments the device 16 monitors for the target indication signal on a predefined one of the candidate links (e.g., the source link). In these instances where the device 16 knows the link on which a target indication signal may be received, the device 16 may use the time and frequency synchronization associated with that candidate link (e.g., associated with reception of the reference signal measured on that candidate link). In other embodiments, though, the device 16 may receive the target indication signal on any of the candidate links, meaning that the device 16 may monitor more than one candidate link (e.g., all links) for the target indication signal. In fact, in some embodiments, the device 16 may attempt to receive the target indication signal on any reported link using blind detection, e.g., by limiting its time and frequency synchronization to the synchronization used to receive the reference signal measured on that candidate link. Alternatively or additionally, where the target indication signal is a target indication reference signal (e.g., target indication mobility reference signal, TI-MRS), the TIS configuration may define the TI-MRS search space in terms of time-frequency resources and sequences for detection and/or may define the mapping of the target link to the transmitted target indication reference signal.

Note that embodiments herein are applicable to any type of wireless communication system (e.g., Long Term Evolution, Wideband CDMA, GSM, Wifi or the like) for switching between links of any kind (e.g., cells, sectors, nodes, beams). In one embodiment, for instance, the system 10 is a cell-based system in which cell-specific reference signals (CRS) are broadcasted in all cells in an always-on, static manner for mobility measurements. In this case, the wireless device 16 may periodically measure links in the form of cells using the CRS and may report those measurements when certain reporting conditions are met (periodic or event based).

In another embodiment, the wireless communication system is a 5G system that employs high-gain beamforming and that transmits mobility reference signals (MRS) on respective beams in a dynamic manner for mobility measurements, i.e., MRS are turned on when needed. Each activated beam may transmit a (device-specific) MRS that contains a timing synchronization component (TSS) whose contents may be common to all beams and a beam identity component (BRS) that is beam-specific. In this case, the wireless device 16 may measure links in the form of beams using MRS that are transmitted on those respective beams. The network may configure the device 16 to measure certain candidate beams using respectively configured MRS, e.g., namely those that are most likely to be acceptable. However, not all candidate beams and MRS configured may end up being acceptable, e.g., due to sudden load changes since mobility measurements are initiated or due to the network transmitting some of the MRS also for purposes of automatic neighbor relation (ANR) establishment. Furthermore, the network may have activated beams which are not optimally directed towards the device 16, e.g., especially if the beams are narrow and feedback from the device 16 has not yet been received. Hence, multiple redundant MRS transmitting beams may be activated for mobility measurements.

Especially in embodiments wherein links are beams realized with high radio frequencies (e.g., microwave) and high-gain beamforming, link switching approaches described herein advantageously provide lightweight, fast (on average), low latency switching, the importance of which is emphasized by the poor diffraction and penetration properties of the high radio frequencies. Indeed, the switching approach herein proves effective in completing the switch even in the face of a rapidly deteriorating source beam. Moreover, the prolonged reporting approach herein, such as where the device 16 reports the best detected candidate beams in a sequential manner using USS, enables the network to consider factors other than beam quality in its switch decision (e.g., beam load).

A network node herein is any type of node in the wireless communication system 10, e.g., in the access network 12 or core network 14. A radio node herein is any type of node (e.g., a base station or wireless communication device) capable of communicating with another node over radio signals. A radio network node is any type of radio node within the access network 12, such as a base station. A wireless communication device or simply wireless device is any type of radio node capable of communicating with a radio network node or another wireless communication device over radio signals. A wireless communication device may therefore refer to a machine-to-machine (M2M) device, a machine-type communications (MTC) device, a narrowband internet of things (NB-IoT) device, etc. The wireless device may also be a user equipment (UE), however it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a wireless communication device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In view of the above modifications and variations, FIGS. 4A and 4B generally indicate processing performed by a wireless device 16 and a network node 18, respectively, according to some embodiments. As shown in FIG. 4A, processing by the wireless device 16 includes configuring the device 16 to perform measurements on a set 20 of candidate links for supporting a network node 18 in the system 10 to make a decision as to which of the candidate links is to be a target link for a link switch (Block 100). Processing by the wireless device 16 further includes reporting (e.g., at the physical layer) measured candidate links one link subset at a time in order of the wireless device's preference for the target link, until the wireless device 16 receives a target indication signal indicating which of the candidate links in the set 20 is to be the target link (Block 110). Any given link subset reports one or more candidate links which the wireless device has measured for the decision. Processing by the wireless device 16 also includes, responsive to receiving the target indication signal, performing the link switch to the indicated target link (Block 120).

As shown in FIG. 4B, processing by the network node 18 includes identifying one or more measured candidate links which the wireless device 16 has reported (e.g., at the physical layer) one link subset at a time in order of the device's preference for the target link (Block 200). Again, any given link subset reports one or more candidate links which the wireless device has measured for the decision. Processing by the network node 18 also includes making the decision as to which identified candidate link is to be the target link, based on the order in which the device 16 reports candidate links (Block 210).

Note that a wireless device 16 as described above may perform the method in FIG. 4A and any other processing herein by implementing any functional means or units. In one embodiment, for example, the wireless device 16 comprises respective circuits or circuitry configured to perform the steps shown in FIG. 4A. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 5B:
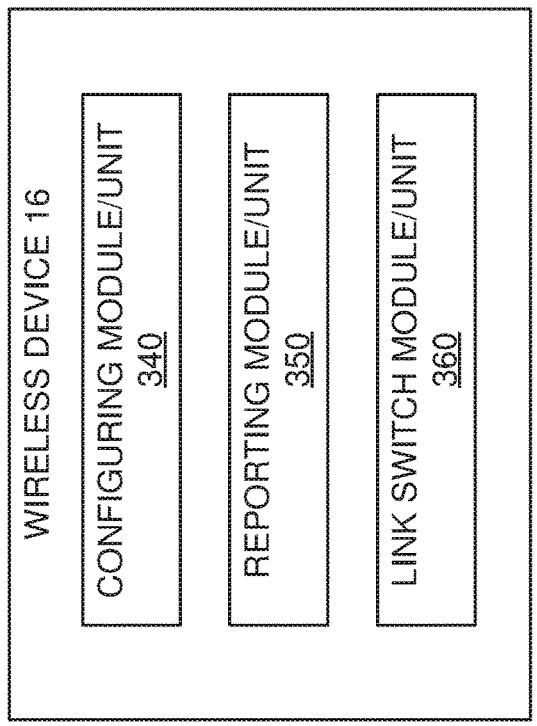
FIG. 5B is a block diagram of a wireless device according to other embodiments.
Figure 5A:
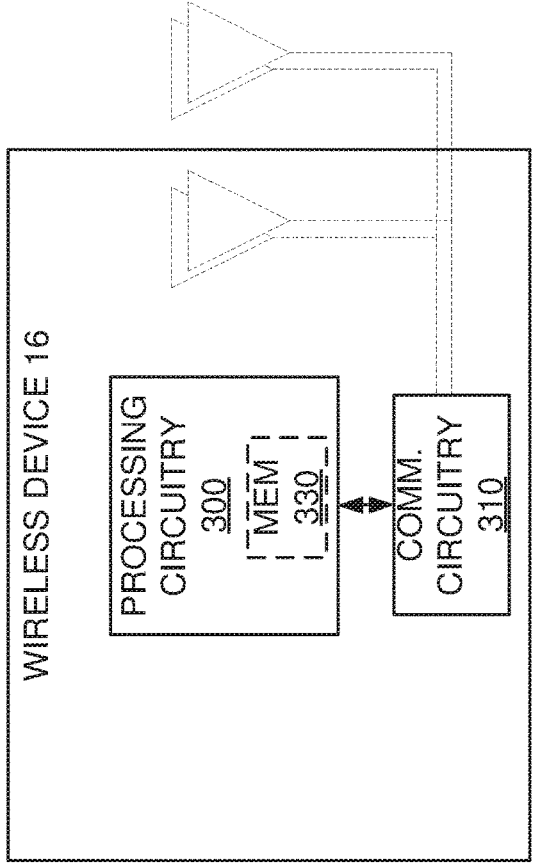
FIG. 5A is a block diagram of a wireless device according to some embodiments.

FIG. 5A for example illustrates the wireless device 16 in accordance with one or more embodiments. As shown, the wireless device 16 includes processing circuitry 300 and communication circuitry 310. The communication circuitry 310 (e.g., in the form of a transmitter, receiver, transceiver, or radio frequency circuitry) is configured to transmit and/or receive information to and/or from one or more other nodes, e.g., via any communication technology. Such communication may occur via one or more antennas that are either internal or external to the wireless device 16 as shown. The processing circuitry 300 is configured to perform processing described above, e.g., in FIG. 4A, such as by executing instructions stored in memory 320. The processing circuitry 300 in this regard may implement certain functional means, units, or modules.

FIG. 5B illustrates the wireless device 16 in accordance with one or more other embodiments. As shown, wireless device 16 implements various functional means, units, or modules, e.g., via the processing circuitry 300 in FIG. 5A and/or via software code, for implementing the functionality described above (e.g., for implementing the steps in FIG. 4A). These functional means, units, or modules include for instance a configuring module or unit 340 for configuring the wireless device 16 to perform measurements on the set of candidate links, a reporting module or unit 350 for (e.g., at the physical layer) reporting measured candidate links one link subset at a time, and a link switch module or unit 360 for performing the link switch to the target link, as described above.

Also note that a network node 18 as described above may perform the method in FIG. 4B, and any other processing herein, by implementing any functional means or units. In one embodiment, for example, the network node 18 comprises respective circuits or circuitry configured to perform the steps shown in FIG. 4B. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6B:
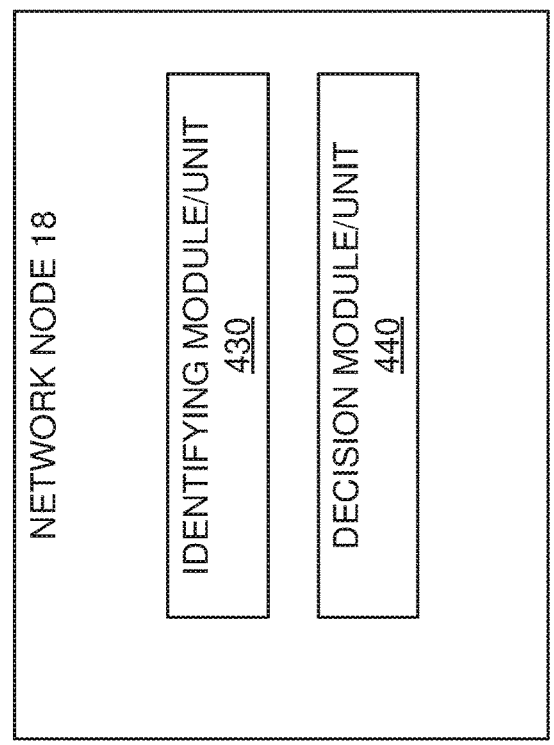
FIG. 6B is a block diagram of a network node according to other embodiments.
Figure 6A:
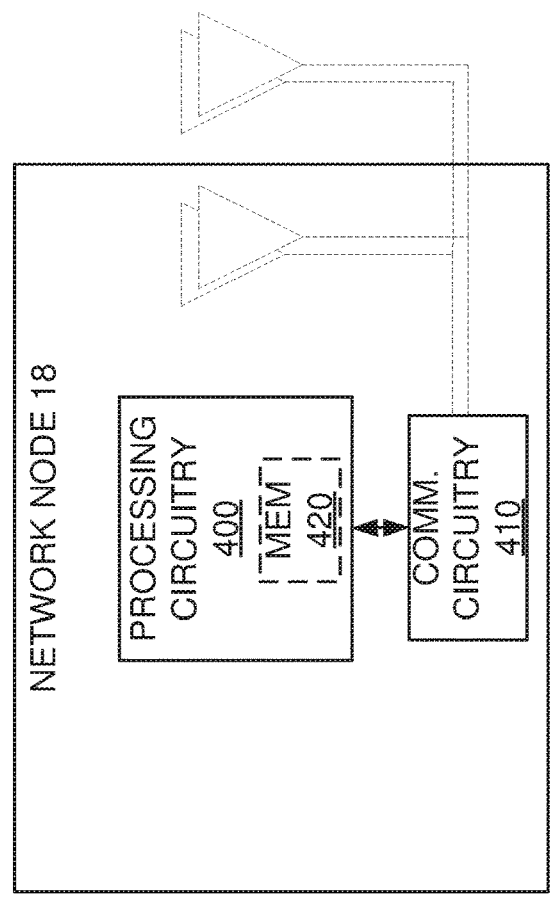
FIG. 6A is a block diagram of a network node according to some embodiments.

FIG. 6A illustrates the network node 18 in accordance with one or more embodiments. As shown, the network node 18 includes processing circuitry 400 and communication circuitry 410. The communication circuitry 410 (e.g., in the form of a transmitter, receiver, transceiver, or radio frequency circuitry) is configured to transmit and/or receive information to and/or from one or more other nodes, e.g., via any communication technology. Where the network node 18 is an access node (e.g., a base station), such communication may occur via one or more antennas that are either internal or external to the network node 18, as shown. The processing circuitry 400 is configured to perform processing described above, e.g., in FIG. 4B, such as by executing instructions stored in memory 420. The processing circuitry 400 in this regard may implement certain functional means, units, or modules.

FIG. 6B illustrates the network node 18 in accordance with one or more other embodiments. As shown, the network node 18 implements various functional means, units, or modules, e.g., via the processing circuitry 400 in FIG. 6A and/or via software code, e.g., for performing respective steps in FIG. 4B. These functional means, units, or modules include for instance an identifying module or unit 430 for identifying one or more measured candidate links which the wireless device 16 has reported (e.g., at the physical layer) one link subset at a time in order of the wireless device's preference for the target link. Also included may be a decision module or unit 440 for making the decision as to which identified candidate link is to be the target link, based on the order in which the wireless device reports candidate links.

Those skilled in the art will also appreciate that embodiments herein further include corresponding computer programs.

A computer program comprises instructions which, when executed on at least one processor of a node (e.g., network node 18 or wireless device 16), cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

Note that the term "subset" is used herein in its general sense to refer to a part or portion of a larger set. This contrasts with the mathematical or technical sense of the term in which a subset may be the same as the set. In mathematical terms, a "subset" as used herein is really a "proper subset." Accordingly, a "link subset" as used herein refers to a part or portion of the larger set of candidate links on which the wireless device 16 is configured to perform measurements.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed by a wireless device in a wireless communication system, the method comprising:
configuring the wireless device to perform measurements on a set of candidate links for providing wireless communications between wireless devices and the wireless communication system, the measurements being for supporting a network node in the wireless communication system to make a decision as to which of the candidate links is to be a target link for a link switch;
at a physical layer, reporting, to the network node, candidate links that have been measured, one link subset at a time in order of the wireless device's preference for the candidate links within the respective subsets, with respect to each candidate link's potential use as a target link, until the wireless device receives a target indication signal indicating which of the candidate links in the set is to be the target link, wherein the reporting for any given link subset reports one or more candidate links which the wireless device has measured for the decision; and
responsive to receiving the target indication signal, performing the link switch to the indicated target link.

2. The method of claim 1, wherein said reporting comprises:
monitoring for receipt of the target indication signal during a monitoring interval after reporting any given link subset; and
reporting a subsequent link subset responsive to the monitoring interval expiring without receipt of the target indication signal.

3. The method of claim 1, wherein said reporting comprises reporting any given link subset, except an initially reported link subset, only after determining that the wireless device did not receive the target indication signal in response to a previously reported link subset, and refraining from reporting any more link subsets responsive to receiving the target indication signal.

4. The method of claim 1, wherein said reporting comprises:
ranking measured candidate links according to defined ranking criteria at the wireless device that ranks candidate links in descending order of preference with respect to the candidate link's potential use as a target link;
reporting, in a first link subset, one or more candidate links that are ranked highest according to said ranking;
monitoring for receipt of the target indication signal following reporting of the first link subset; and
if no target indication signal is received during said monitoring, reporting, in a second link subset, one or more candidate links that are ranked next highest according to said ranking.

5. The method of claim 4, wherein the defined ranking criteria ranks candidate links that are measured as having higher signal quality higher than candidate links that are measured as having lower signal quality.

6. The method of claim 1, wherein identities of measured candidate links and results of the measurements performed on those candidate links are reported at the physical layer one link subset at a time.

7. The method of claim 1, wherein only selected ones of the measured candidate links that are deemed acceptable by the wireless device as the target link, according to one or more defined criteria, are reported by the wireless device.

8. The method of claim 1, wherein each link subset reports a single candidate link which the wireless device has measured for the decision.

9. The method of claim 1, wherein each link subset reports multiple candidate links which the wireless device has measured for the decision.

10. The method of claim 1, further comprising dynamically configuring how many candidate links are to be reported by each link subset.

11. The method of claim 1, wherein any given link subset is reported by one or more uplink synchronization signals from the wireless device that respectively identify the one or more candidate links in that given link subset.

12. The method of claim 1, wherein any given candidate link is reported by an uplink signal from the wireless device on that given candidate link.

13. The method of claim 1, wherein any given link subset is reported by one or more signals on radio resources that are reserved before the wireless device performs the measurements.

14. The method of claim 1, wherein the target indication signal is transmitted on the target link.

15. The method of claim 1, wherein the target indication signal is an uplink grant or a timing advance configuration signal on a physical downlink control channel.

16. The method of claim 1, wherein the target indication signal is a reference signal that contains a timing synchronization component that is common amongst the candidate links and an identity component that identifies the target link.

17. The method of claim 1, wherein the candidate links are candidate beams.

18. A method performed by a network node in a wireless communication system for making a decision as to which candidate link in a set of candidate links for providing wireless communications between wireless devices and the wireless communication system is to be a target link for a link switch by a wireless device, wherein the wireless device is configured to perform measurements on the set of candidate links, the method comprising:
   identifying one or more measured candidate links which the wireless device has reported at a physical layer one link subset at a time in order of the wireless device's preference for the candidate links within the respective subset, with respect to each candidate link's potential use as a target link, wherein any given link subset reports one or more candidate links in the set which the wireless device has measured for the decision; and
   making the decision as to which identified candidate link is to be the target link, based on the order in which the wireless device reports candidate links.

19. The method of claim 18, wherein making the decision comprises evaluating whether any given identified candidate link is to be the target link, further based on one or more characteristics associated with that given identified candidate link, and wherein the method further comprises determining the one or more characteristics using at least some information not reported by the wireless device.

20. The method of claim 19, wherein the one or more characteristics include one or more of traffic load, signaling load, uplink quality, backhaul quality, latency, and usage statistics.

21. The method of claim 19, wherein the one or more characteristics associated with the given identified candidate link include one or more characteristics of the given identified candidate link, one or more characteristics of an access node providing the given identified candidate link, or one or more characteristics of a backhaul link supporting the given identified candidate link.

22. The method of claim 18, wherein making the decision comprises evaluating whether any given identified candidate link is to be the target link, further based on one or more of:
   whether selection of the given identified candidate link as the target link would require the wireless device to add another connectivity leg to the system; and
   whether selection of the given identified candidate link as the target link would require uplink/downlink separation whereby the wireless device connects to different access nodes for uplink and downlink communication.

23. The method of claim 18, wherein any given candidate link is reported by an uplink signal from the wireless device on that given candidate link, and wherein making the decision comprises evaluating whether a reported candidate link is to be the target link by:
   determining a quality of the uplink signal which reports that candidate link; and
   evaluating whether the reported candidate link is to be the target link, based on the determined quality.

24. The method of claim 18, further comprising, after the wireless device reports any given link subset:
   determining whether to make the decision that a reported link candidate is to be the target link; and
   waiting for report of another link subset if it is determined not to make the decision.

25. The method of claim 18, further comprising, responsive to making the decision, controlling transmission of a target indication signal to the wireless device indicating the target link according to the decision made.

26. The method of claim 18, wherein the method is performed by a target radio access node providing the target link to the wireless device.

27. The method of claim 18, further comprising, responsive to determining that no identified candidate link meets criteria specified as required for the target link, dynamically adapting the criteria to be less stringent as needed in order to make the decision.

28. The method of claim 18, wherein candidate links that are higher ranked by the wireless device are reported sooner in time than candidate links that are lower ranked by the wireless device, according to defined ranking criteria at the wireless device that ranks candidate links in descending order of preference for the target link.

29. A wireless device for use in a wireless communication system, the wireless device comprising:
   processing circuitry and a memory, the memory containing instructions executable by the processing circuitry whereby the wireless device is configured to:
   configure the wireless device to perform measurements on a set of candidate links for providing wireless communications between wireless devices and the wireless communication system, the measurements being for supporting a network node in the wireless communication system to make a decision as to which of the candidate links is to be a target link for a link switch;
   at a physical layer, report to the network node, candidate links that have been measured, one link subset at a time in order of the wireless device's preference for the candidate links within the respective subsets, with respect to each candidate link's potential use as a target link, until the wireless device receives a target indication signal indicating which of the candidate links in the set is to be the target link, wherein any given link subset reports one or more candidate links which the wireless device has measured for the decision; and
   responsive to receiving the target indication signal, perform the link switch to the indicated target link.

30. A network node for use in a wireless communication system for making a decision as to which candidate link in a set of candidate links for providing wireless communications between wireless devices and the wireless communication system is to be a target link for a link switch by a wireless device, wherein the wireless device is configured to perform measurements on the set of candidate links, the network node comprising:
   processing circuitry and a memory, the memory containing instructions executable by the processing circuitry whereby the network node is configured to:
   identify one or more measured candidate links which the wireless device has reported at a physical layer one link subset at a time in order of the wireless device's preference for the candidate links within the respective subset, with respect to each candidate link's potential use as a target link, wherein any given link subset reports one or more candidate links in the set which the wireless device has measured for the decision; and
   make the decision as to which identified candidate link is to be the target link, based on the order in which the wireless device reports candidate links.

* * * * *